United States Patent [19]

Zander

[11] Patent Number: 5,463,439
[45] Date of Patent: Oct. 31, 1995

[54] FOLD-IN INFORMATION-BEARING PANEL AND FOLD-OUT WRITE-ON PANEL FOR OUTER COVER OF SINGLE-USE CAMERA

[75] Inventor: Dennis R. Zander, Penfield, N.Y.

[73] Assignee: Eastman Kodak Company, Rochester, N.Y.

[21] Appl. No.: 246,053

[22] Filed: May 19, 1994

[51] Int. Cl.$^6$ ............................ G03B 17/02; G03B 17/24
[52] U.S. Cl. ............................................ 354/288; 354/107
[58] Field of Search ................................... 354/105, 288, 354/107

[56] References Cited

U.S. PATENT DOCUMENTS

| | | | |
|---|---|---|---|
| 1,210,804 | 1/1917 | Howland | 354/107 |
| 1,222,531 | 4/1917 | Cooper | 354/107 |
| 1,251,915 | 1/1918 | Osteen. | |
| 1,269,432 | 6/1918 | Hansen | 354/107 |
| 3,082,424 | 3/1963 | Laird | 346/107 |
| 4,226,517 | 10/1980 | Skarman | 354/75 |
| 4,721,971 | 1/1988 | Scott | 354/105 |
| 4,825,233 | 4/1989 | Kanai et al. | 354/106 |
| 4,862,200 | 8/1989 | Hicks | 354/75 |
| 5,119,119 | 6/1992 | Amano et al. | 354/106 |
| 5,285,228 | 2/1994 | VanDeMoere | 354/219 |

FOREIGN PATENT DOCUMENTS 4-281449  10/1992  Japan ............................ G03C 3/00

*Primary Examiner*—Russell E. Adams
*Assistant Examiner*—Nicholas J. Tuccillo
*Attorney, Agent, or Firm*—Roger A. Fields

[57] ABSTRACT

A decorative outer cover for a camera body of a single-use camera comprises a single-piece information-bearing panel and write-on panel connected together at a common fold line. The information-bearing panel is located on top of the write-on panel to substantially conceal the write-on panel and is foldable beneath the write-on panel along the fold line to substantially reveal the write-on panel.

5 Claims, 5 Drawing Sheets

FOLD-IN INFORMATION-BEARING PANEL AND FOLD-OUT WRITE-ON PANEL FOR OUTER COVER OF SINGLE-USE CAMERA

FIELD OF THE INVENTION

The invention relates generally to the field of photography, and in particular to single-use cameras. More specifically, the invention relates to a write-on element of a single-use camera for recording a message or other information which may, for example, be back printed on a customer's prints.

BACKGROUND OF THE INVENTION

Film and cameras that are all in one, commonly referred to as single-use or disposable cameras, have recently become well known. Typically, the single-use camera is a simple point-and-shoot type which comprises a plastic light-tight inner body housing a fixed-focus taking lens, a film metering mechanism, a single blade shutter, a frame counter for indicating the number of exposures remaining for picture-taking, possibly a built-in electronic flash unit, and a decorative cardboard outer cover or casing containing the light-tight inner body and having respective openings for the taking lens, a shutter release button, a film advance thumbwheel, a direct see-through viewfinder, the frame counter, and a flash emission window. At the manufacturer, the light-tight inner body is loaded with a 12, 24, or 36 exposure 35 mm film cassette and substantially the entire length of the unexposed filmstrip is factory prewound from the cassette onto a spool in the inner body or simply into a roll. Then, after the photographer takes a picture, he or she manually rotates the thumbwheel to rewind the exposed frame into the cassette. The rewinding movement of the filmstrip the equivalent of slightly more than one frame width rotates a metering sprocket to decrement the frame counter to its next lower-numbered setting. Further details of this operation are disclosed in commonly assigned U.S. Pat. No. 5,235,366, issued Aug. 10, 1993, and in U.S. Pat. No. 4,890,130, issued Dec. 26, 1989. When the maximum number of exposures available on the filmstrip are exposed and the filmstrip is completely rewound into the cassette, the camera is given to a photofinisher who first removes the cassette with the filmstrip from the inner body to develop the negatives and make prints for the customer and then forwards the camera to the manufacturer for recycling.

The customer may prefer to have a message or other information back printed on his or her prints. However, since most of the available space on the decorative outer cover of the single-use camera is filled with instructions or other detail, there typically is no space on the outer cover for writing a message to be back printed on the prints.

SUMMARY OF THE INVENTION

According to the invention, a decorative outer cover for a camera body of a single-use camera comprises a single-piece information-bearing panel and write-on panel connected together at a common fold line. The information-bearing panel is located on top of the write-on panel to substantially conceal the write-on panel and is foldable beneath the write-on panel along the fold line to substantially reveal the write-on panel. Thus, a compact efficient design is achieved.

DETAILED DESCRIPTION OF THE INVENTION

The invention is disclosed as being embodied preferably in a single-use 35 mm camera. Because the features of a single-use 35 mm camera are generally known, the description which follows is directed in particular only to those elements forming part of or cooperating directly with the disclosed embodiment. It is to be understood, however, that other elements may take various forms known to a person of ordinary skill in the art.

Figure 1:
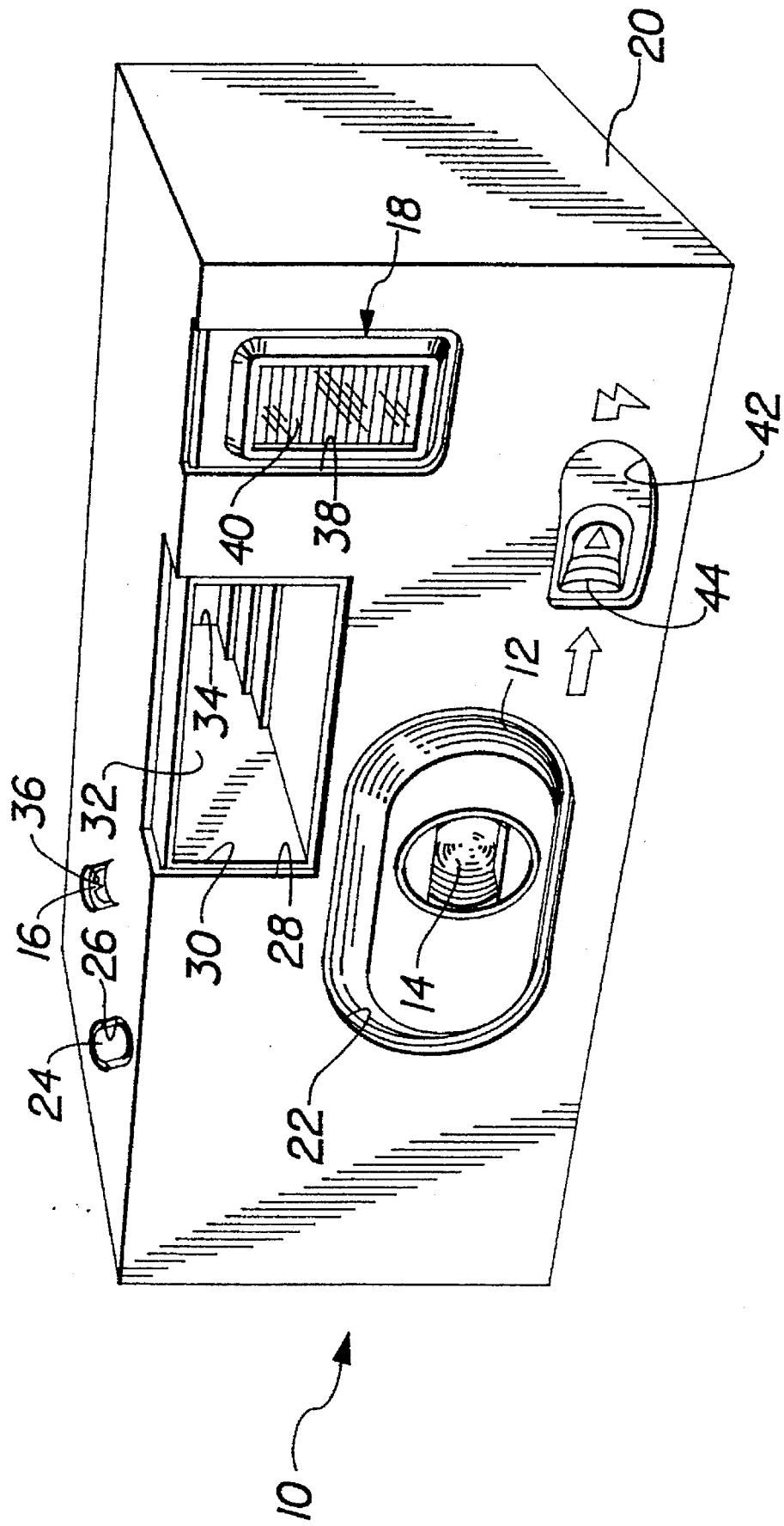
FIG. 1 is a front perspective view of a single-use camera.

Referring now to the drawings, FIG. 1 depicts a single-use 35 mm camera 10 which comprises a plastic light-tight inner body 12 housing a fixed-focus taking lens 14, a film metering mechanism, not shown, a single blade shutter, not shown, a frame counter 16 for indicating the number of exposures remaining for picture-taking, an electronic flash unit 18, and a decorative cardboard outer cover or casing 20 containing the light-tight inner body. The outer cover 20 has a front opening 22 for the taking lens 14, a top opening 24 for a shutter release button 26, a front opening 28 for a front viewfinder window 30 of a direct see-through viewfinder 32, a rear opening 33 for a rear viewfinder window 34, a top opening 36 for the frame counter 16, a front opening 38 for a flash emission window 40 of the flash unit 18, and a front opening 42 for a manual push element 44 which is pushed to the right in FIG. 1 to ready the flash unit.

At the manufacturer, the light-tight inner body 12 is loaded with a 12, 24, or 36 exposure 35 mm film cassette and substantially the entire length of the unexposed filmstrip is factory prewound from the cassette onto a spool in the inner body or simply into a roll. Then, after the photographer takes a picture, he or she manually rotates a film advance thumbwheel, not shown, to rewind the exposed frame into the cassette. The rewinding movement of the filmstrip the equivalent of slightly more than one frame width rotates a metering sprocket to decrement the frame counter 16 to its next lower-numbered setting. Further details of this operation are disclosed in commonly assigned U.S. Pat. No. 5,235,366, issued Aug. 10, 1993, and in U.S. Pat. No. 4,890,130, issued Dec. 26, 1989. When the maximum number of exposures available on the filmstrip are exposed and the filmstrip is completely rewound into the cassette, the camera 10 is given to a photofinisher who first removes the cassette with the filmstrip from the inner body to develop the negatives and make prints for the customer and then forwards the camera to the manufacturer for recycling.

Figure 2:
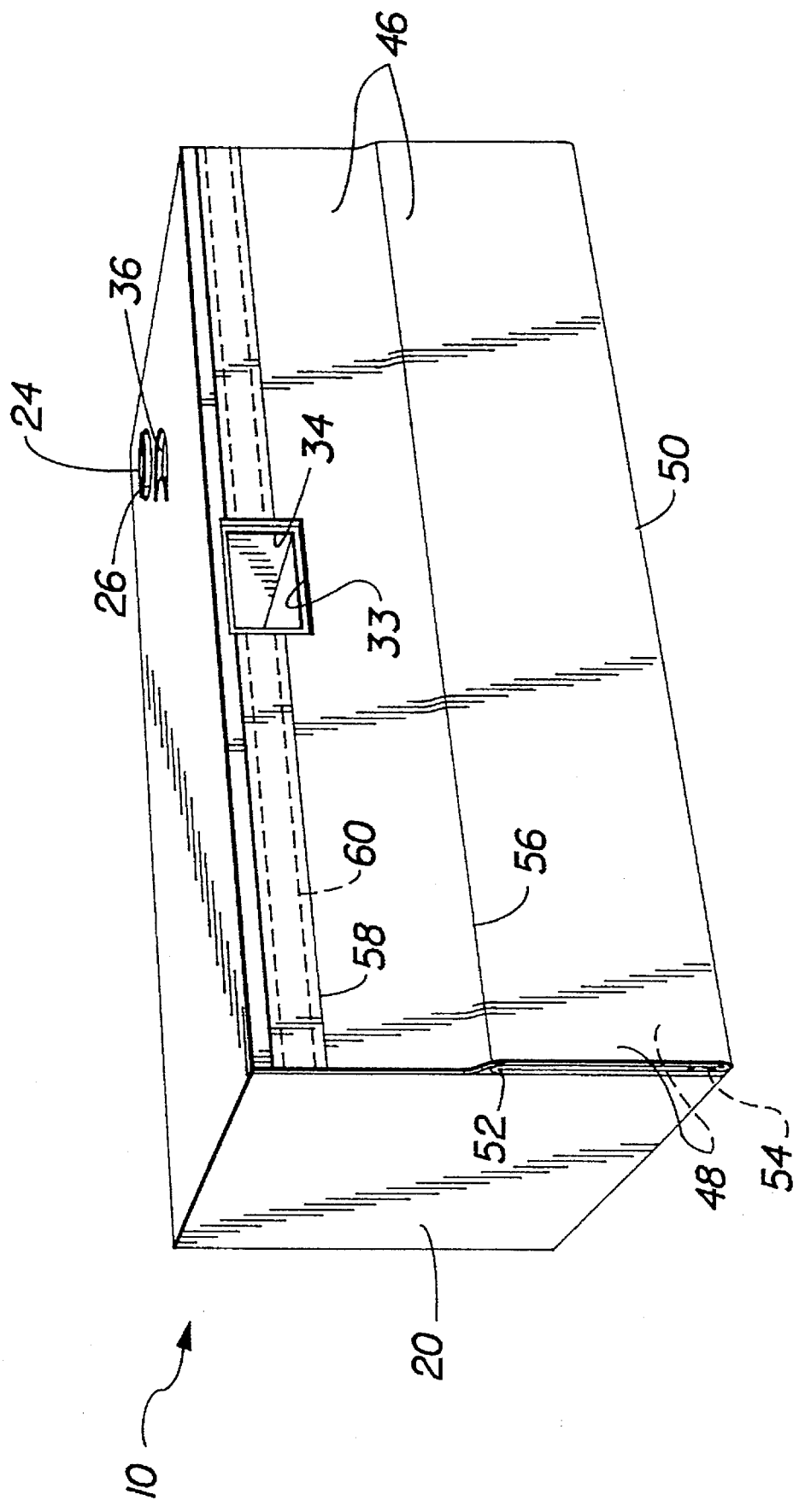
FIGS. 2–5 are rear perspective views of the single-use camera illustrating use of a fold-in information-bearing panel and a fold-out write-on panel on an outer cover of the camera body.
Figure 3:
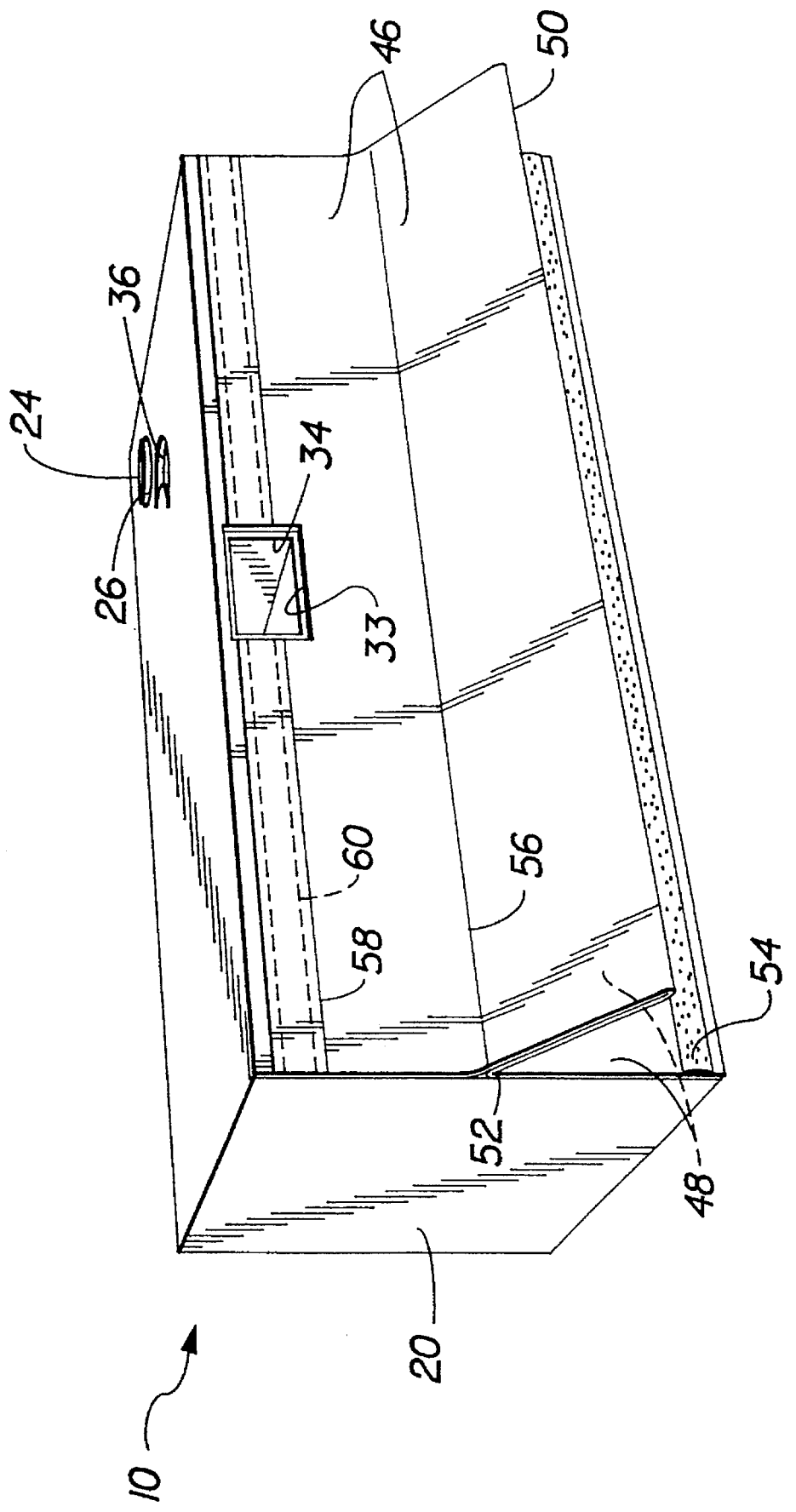
Figure 4:
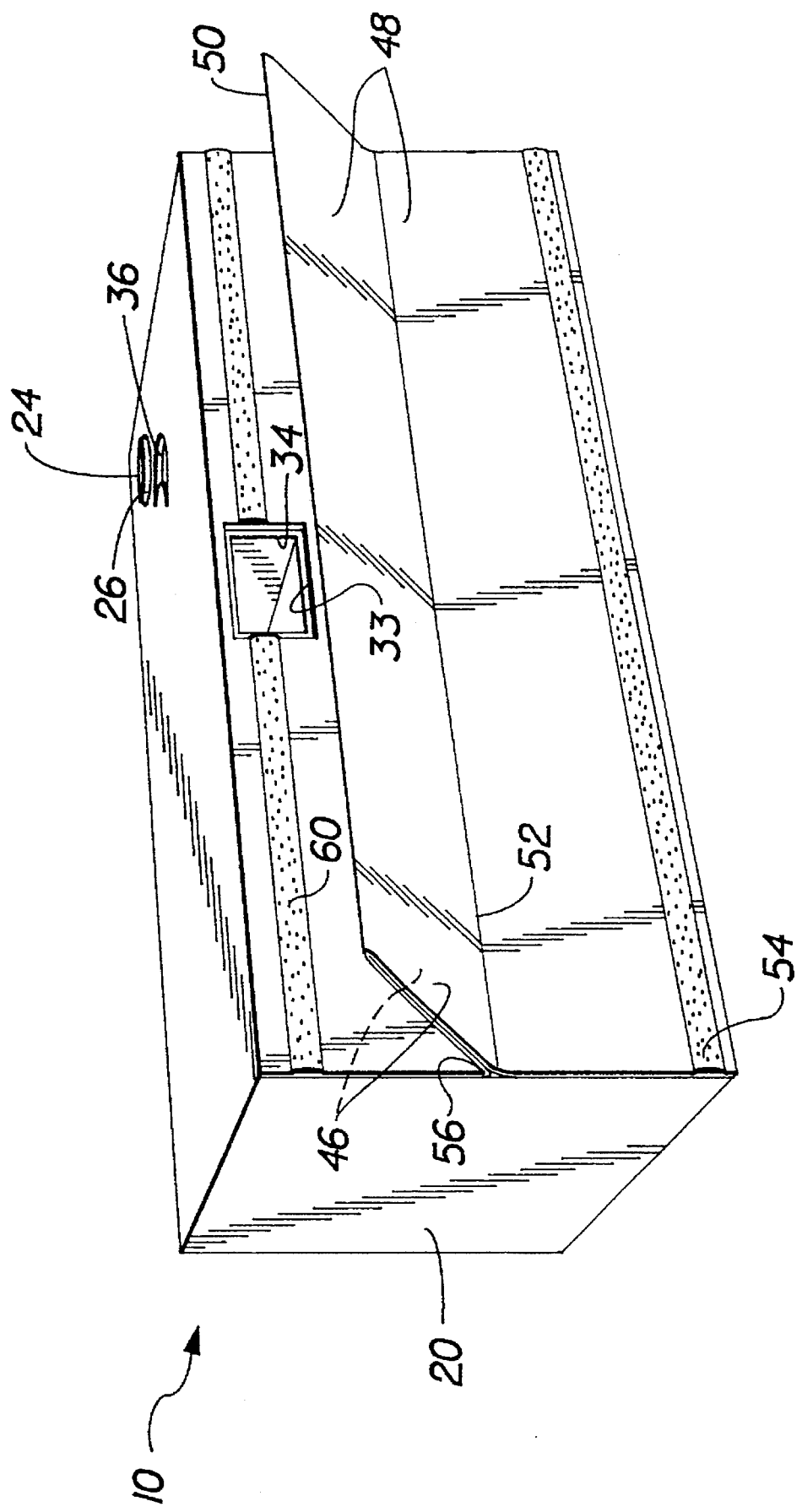
Figure 5:
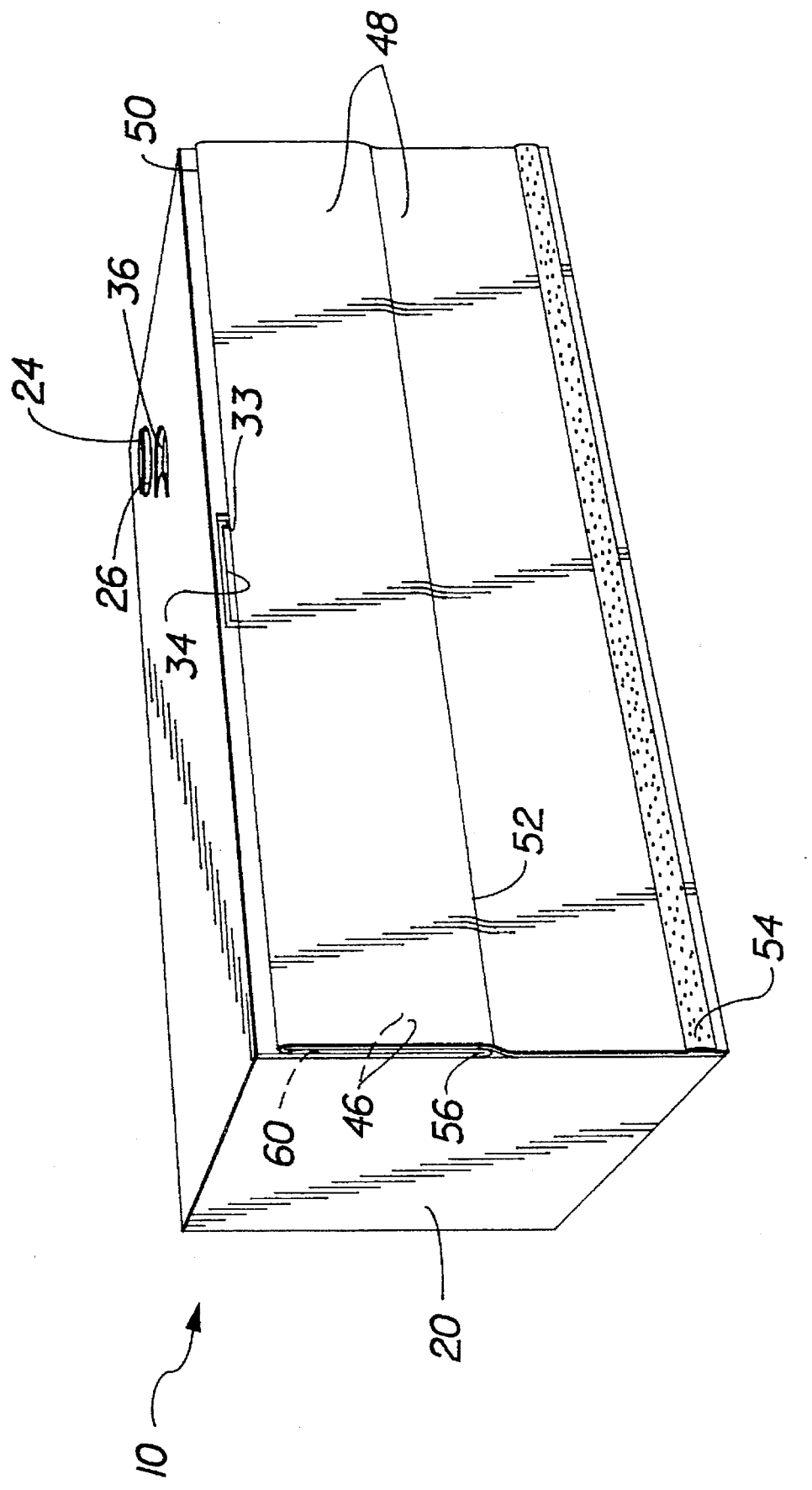

According to the invention, which is shown in FIGS. 2–5, the outer cover 20 includes at its rear side a single-piece information-bearing panel 46 and a write-on panel 48 connected together at a common fold line 50. The information-bearing panel 46 has printed instructions regarding use of the camera 10, and as shown in FIG. 2 is originally located on top of the write-on panel 48 to conceal the write-on panel. The write-on panel 48 has an intermediate fold line 52 which together with the common fold line 50 allows the write-on panel to be folded into two stacked portions beneath the information-bearing panel 46 as shown in FIG. 2, and as shown in FIGS. 3–5 to be unfolded from beneath the information-bearing panel. A tacky strip 54 is located along one of the stacked portions of the write-on panel 48 to contact the other stacked potion to temporarily hold the write-on panel folded beneath the information-bearing panel 46, but the other stacked portion can be separated from the tacky strip as shown in FIG. 3 to allow the write-on panel to be unfolded. The information-bearing panel 46 has an intermediate fold line 56 which allows it to be folded into two stacked portions beneath the write-on panel 48 as shown in FIGS. 4 and 5, when the write-on panel is unfolded from beneath the information-bearing panel. A peel-off cover 58 is removed from a tacky strip 60 that is located to hold the information-bearing panel 46 folded beneath the write-on panel 48 as shown in FIG. 5. When the information-bearing panel 46 and the the write-on panel 48 are folded as shown in FIG. 5, they partly cover the rear viewfinder window 34 to prevent one from looking through the window. The write-on panel 48 is used to record a message or other information which can be back printed on a customer's prints. For example, the customer can write a date, title, or subject on the write-on panel 48. Also, the customer can write his or her name and/or address on the write-on panel 48 and indicate his or her preference for certain photofinisher offered features.

The invention has been described with reference to a preferred embodiment. However, it will be appreciated that variations and modifications can be effected by a person of ordinary skill in the art without departing from the scope of the invention.

PARTS LIST 10. camera
12. inner light-tight body
14. taking lens
16. frame counter
18. flash unit
20. decorative cardboard cover
22. front opening
24. shutter release button
26. top opening
28. front opening
30. front viewfinder window
32. direct see-through viewfinder
33. rear opening
34. rear viewfinder window
36. top opening
38. front opening
40. flash emission window
42. front opening
44. manual push element
46. information-bearing panel
48. write-on panel
50. common fold line
52. intermediate fold line
54. tacky strip
56. intermediate fold line
58. peel-off cover
60. tacky strip

I claim:

1. A decorative outer cover for a camera body of a single-use camera, comprising:

a single piece information-bearing panel and write-on panel connected together at a common fold line, said information-bearing panel being located on top of said write-on panel to substantially conceal the write-on panel and being foldable beneath the write-on panel along said fold line to substantially reveal the write-on panel; and securing means located to hold said write-on panel folded beneath said information-bearing panel and which can release the write-on panel to allow it to be unfolded, and located to hold said write-on panel unfolded with said information-bearing panel folded beneath the write-on panel.

2. A decorative outer cover as recited in claim 1, wherein said information-bearing panel and said write-on panel have respective fold lines which together with said common fold line either allow the write-on panel to be folded into stacked portions beneath the information-bearing panel and to be unfolded or allow the information-bearing panel to be folded into stacked portions beneath the write-on panel when the write-on panel is unfolded.

3. A decorative outer cover for a camera body of a single-use camera, comprising:

a fold-in information-bearing panel and a fold-out write-on panel, said write-on panel being foldable outward from beneath the information-bearing panel to allow the information-bearing panel to be folded inward to beneath the write-on panel; and securing means for releasably holding said write-on panel folded beneath said information-bearing panel and for holding the information-bearing panel folded beneath the write-on panel when the write-on panel is released.

4. A single-use camera comprising a camera body, and a decorative outer cover for said camera body, is characterized in that:

said outer cover has an information-bearing panel and a write-on panel, said write-on panel being movable out from beneath said information-bearing panel to record a massage on the write-on panel; and a rear viewfinder window is located to be at least partially covered when the write-on panel is moved out from beneath the information-bearing panel.

5. A single-use camera as recited in claim 4, wherein said information-bearing panel is movable to beneath said write-on panel when the write-on panel is moved out from beneath the information-bearing panel.

* * * * *